United States Patent [19]

Lien-Hsing

[11] 4,331,368
[45] May 25, 1982

[54] EASILY ASSEMBLED OR DISASSEMBLED DRAWER

[76] Inventor: Wu Lien-Hsing, 2nd fl., No. 42, Lane 204, Sung Chiang Rd., Taipei, Taiwan

[21] Appl. No.: 144,023

[22] Filed: Apr. 29, 1980

[51] Int. Cl.³ .............................................. A47B 47/00
[52] U.S. Cl. ................................ 312/330 R; 312/263; 312/265; 52/586
[58] Field of Search ................... 312/265, 263, 330 R, 312/330 SM, 111, 140; 52/586

[56] References Cited

U.S. PATENT DOCUMENTS

| | | | |
|---|---|---|---|
| 2,160,653 | 5/1939 | Green et al. | 312/265 |
| 2,701,174 | 2/1955 | Franks | 312/330 R |
| 3,372,518 | 3/1968 | Rensch | 52/586 |
| 3,901,572 | 8/1975 | Litchfield | 312/263 |
| 4,012,090 | 3/1977 | Pfeifer et al. | 312/330 R |
| 4,036,542 | 7/1977 | Courtwright | 312/330 R |
| 4,047,777 | 9/1977 | Pfeifer et al. | 312/265 |
| 4,169,639 | 10/1979 | Zola | 312/265 |

FOREIGN PATENT DOCUMENTS 2757880 4/1979 Fed. Rep. of Germany ...... 312/263

Primary Examiner—Victor N. Sakran

[57] ABSTRACT

An easily assembled or disassembled drawer is composed of a front vertical plate, two side vertical plates, a back vertical plate and a horizontal bottom plate. Each of said front plate and said two side plates is respectively formed two tunnels therein. Each of the plates except that bottom plate is formed a groove near the bottom edge thereof. Said bottom plate is inserted into the grooves of the four vertical plates and two belts are passing through the two tunnels within the front plate and side plates. After tightening and binding the belts at the back vertical plate, a drawer is assembled which may be simply dismantled only by breaking said belts.

1 Claim, 2 Drawing Figures

EASILY ASSEMBLED OR DISASSEMBLED DRAWER

BACKGROUND OF THE INVENTION

The conventional drawers used in furniture such as wooden cabinet, cupboard, chest or wardrobe are assembled by means of tenons, nails or screws. By using nails or screws to combine the drawer parts, the assembled drawer product may be slightly displaced during fixing process and must be further flattened or trimmed by plane. If for shipping, handling or storing uses, said drawer shall be dismantled for its package. It will thus cost time, labour and inconvenience. When re-assembling it, the nails or screws must be fixed back into their original holes. However, once the nail or screw hole was dug or drilled, the hole will be loosen so that the drawer after being re-assembled may become weak in construction.

The present inventor has found these defects and researched to disclose the present new drawer which can be easily assembled or disassembled.

SUMMARY OF THE INVENTION

One object of the present invention is to provide an easily assembled or disassembled drawer in that two belts passing the tunnels within the four vertical plates which engage with a bottom plate in the grooves of said vertical plates are tightened and bound at the rear side thereof so as to assemble the drawer without nailing, rivetting or threading.

Another object of the present invention is to provide an easily assembled or disassembled box or case by using the same construction principles as above-mentioned drawer.

DESCRIPTION OF THE PREFERRED EMBODIMENT

Figure 2:
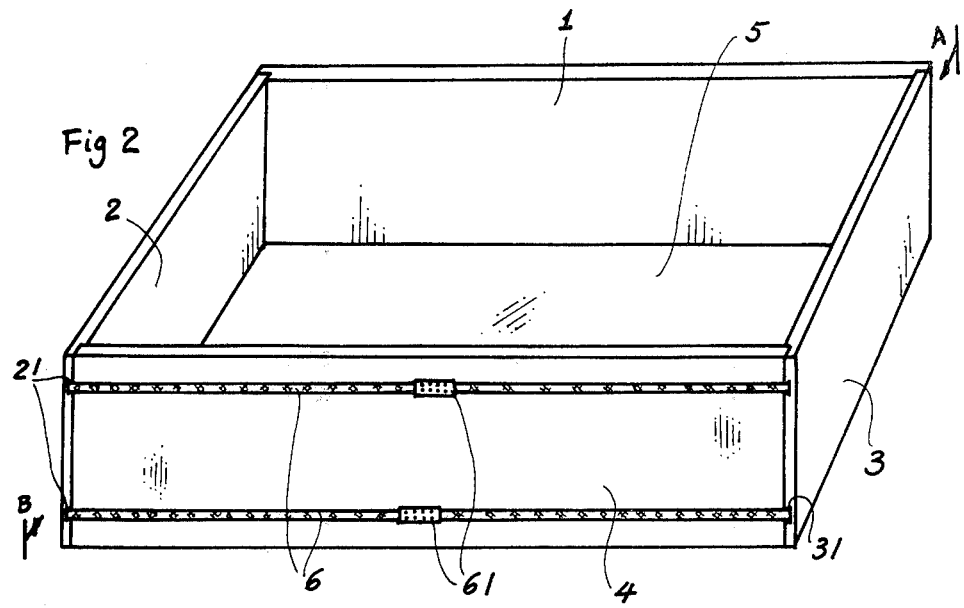
FIG. 2 is the perspective drawing of the present invention from rear side B. (Front view is taken from direction A.)
Figure 1:
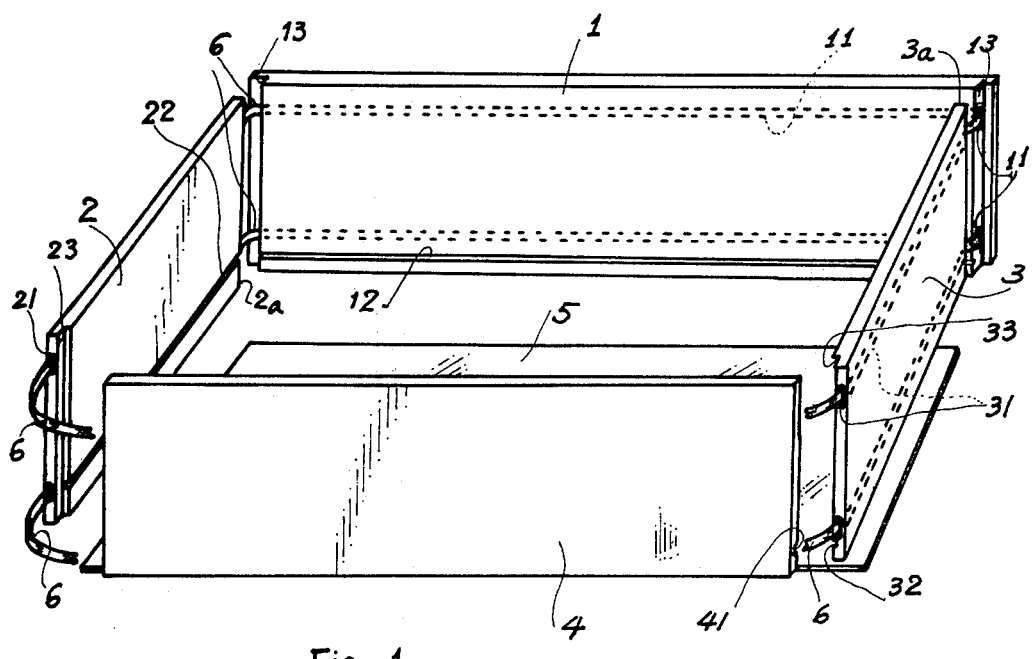
FIG. 1 is the illustration showing the assembling part of the present invention.

As shown in FIGS. 1 and 2, a drawer of the present invention is composed of a vertical front plate 1, two vertical side plates 2, 3, a vertical back plate 4 and a horizontal bottom plate 5.

Each of the four vertical plates 1, 2, 3 and 4 is formed two horizontal tunnels therein. Said front plate 1 is formed an upper tunnel and a lower tunnel 11, 11 within said plate. A horizontal groove 12 is provided near the bottom edge of the plate by facing to the center of assembled drawer. Two extensions 13, 13 each having the same height as that of the plate 1 are horizontally extended from both sides of said front plate 1.

Each of two vertical side plates is also formed two tunnels 21, 21 and groove 22. Only one extension 23 or 33 is formed on one side of said side plate 2 or 3 of which the other side 2a or 3a is made flat so as to engage with said extension 13 of said front plate Said back plate 4 is formed a groove 41 near the bottom edge thereof.

Said bottom plate 5 may be engaged with said grooves 12, 22, 32 and 41 of four vertical plates 1, 2, 3, 4.

All the height of tunnels or grooves in the plates are equal for precise assembly.

Said belt 6 is respectively passing said tunnel 21, 11 and 31 in front and side plates.

When assembling the present drawer, two belts are first passing through tunnels 21, 11 and 31. The side plates 2,3 are pushed to said front plate 1 so that the flat end 2a, 3a may stop at the extension 13, 13 of said plate 1. The bottom plate 5 is inserted into groove 12, 22 and 32. Then, the back plate 4 is moved to fence the drawer so that two ends of said plate 5 may stop at extensions 23, 33 of said side plates 2, 3 and the groove 41 may engage with the rear side of said bottom plate 5. The belt 6 is then tightened by a packer and a clamp 61 is pressed by packer to bind two free ends of said belt 6 at the back side of plate 4.

Said belt 6 may be chosen from plastics, thin metal, wire or other suitable materials having thinner thickness and good tensile strength. Said belt 6 should be flexible and be made as thin as possible so that when assembling said vertical plates and said bottom plate, the outer configuration of the assembled drawer will be compact without revealing the belt and allowance among the vertical plates except the rear belt portion behind said rear vertical plate 4. Such belts are embedded within said tunnels 11, 21 and 31 and only revealed at the rear side for final binding so that a pretty appearance of the integrated drawer will be observed and the reciprocative abrasion during operating said drawer will not wear said belt for longer and stronger service of the present invention.

The present invention is not restricted to the foregoing drawer. The cases or boxes may be constructed by the same method as assembling the present drawer by those skilled in the art.

The present drawer can be easily dismantled by cutting the belts 6 to reduce the volume and measurement beneficial for shipping, handling or storing use. It can be fast re-assembled by fixing the belts 6 without the aid of nail or screw.

I claim:

1. An easily assembled or disassembled drawer comprising a vertical front plate, two vertical side plates, a vertical back plate and a horizontal bottom plate, said front plate being formed two horizontal tunnels within said plate and formed a horizontal groove near the bottom edge thereof and extending horizontally two extensions on both sides thereof to engage with said two side plates, each of said two side plates being respectively formed two horizontal tunnels therein and a groove near the bottom edge thereof and respectively extending an extension to engage with said back plate, said back being formed a groove near the bottom edge thereof, said bottom plate being inserted into grooves of all the vertical plates, two belts passing through said two horizontal tunnels within said vertical plates and fencing said vertical plates which have been engaged with said bottom plate to be finally tightened and bound at said back plate, the improvement which comprises: said two belts being flexible and being made as thin as possible so that when assembling said vertical plates and said bottom plates, the outer feature of the assembled drawer will be compact without revealing the belt and allowance among the front plate and the side plates.

* * * * *